July 14, 1931.    O. R. SWEENEY    1,814,268
MACHINE FOR PRODUCING INSULATING LUMBER
Filed Oct. 19, 1929    5 Sheets-Sheet 2

Fig. 2.

Inventor
Orland R. Sweeney
By M. Talbert Lick
Attorney

July 14, 1931.  O. R. SWEENEY  1,814,268
MACHINE FOR PRODUCING INSULATING LUMBER
Filed Oct. 19, 1929   5 Sheets-Sheet 3

Inventor
Orland R. Sweeney
By M. Talbert Dick
Attorney

July 14, 1931.　　　　O. R. SWEENEY　　　　1,814,268
MACHINE FOR PRODUCING INSULATING LUMBER
Filed Oct. 19, 1929　　　5 Sheets-Sheet 4

Inventor
Orland R. Sweeney
By M. Talbert Dick
Attorney

July 14, 1931. O. R. SWEENEY 1,814,268
MACHINE FOR PRODUCING INSULATING LUMBER
Filed Oct. 19, 1929 5 Sheets-Sheet 5

Inventor
Orland R. Sweeney
By M. Talbert Dick
Attorney

Patented July 14, 1931

1,814,268

UNITED STATES PATENT OFFICE

ORLAND R. SWEENEY, OF AMES, IOWA, ASSIGNOR TO IOWA STATE COLLEGE OF AGRICULTURAL AND MECHANICAL ARTS, OF AMES, IOWA, A CORPORATION OF IOWA

MACHINE FOR PRODUCING INSULATING LUMBER

Application filed October 19, 1929. Serial No. 400,996.

The principal object of this invention is to provide a machine capable of successfully producing insulating lumber and the like.

A further object of my invention is to provide a machine that may easily be adjusted to produce insulating lumber of various and uniform thicknesses.

A still further object of this invention is to provide an insulating lumber making machine that produces a board having its fibers well matted throughout its entire thickness.

A still further object of my invention is to provide an insulating lumber forming machine that produces board without undesirable cracks being made in the board during the forming process.

A still further object of this invention is to provide a machine for producing insulating lumber that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims and illustrated in the accompanying drawings, in which:

Fig. 1 is a side sectional view of my invention, during the process of forming insulating lumber from such materials as cornstalks, straw, sugar cane, spent licorice root, and the like.

In the building art today large quantities of a relatively weak, highly insulating material known variously by such terms as wall board, insulating lumber, and synthetic lumber is being used. This material is often used as a substitute for sheathing, for lath, for interior house finishing, subroofing and subflooring, and for insulation in refrigerators. This material is being made on three general types of forming machines. The first type is generally called the cylinder forming machine. This consists of two cylinders covered by a woven wire and so provided with a head or feed box that as the pulp runs between the screens, much of the water is drained away and the board emerges from the other side, ready to go into the press part of the machine, after which it is dried, sawed into shapes, and is ready for the market. One of the chief objections to this machine is that it tends to laminate the board, thereby making it less strong than would be the case where the fibers are well matted throughout the entire thickness of the board. A second type of machine now in use consists of a revolving drum which is immersed in a large vat. The drum is provided with a series of partitions radiating from the center to the outer edge which is covered with a screen. Each of these partitions connect with a valve in the center and as the drum revolves, the valves apply suction until the drum has revolved to a certain position, when the vacuum is broken and air permitted to rush in.

This type of machine is not satisfactory because the pulp tends to segregate in the bottom of the tank, and the mat does not always pick up uniformly. Also a large amount of energy is wasted when the vacuum is broken allowing the air to rush back into the compartments.

The third type of machine is modeled after the Fourdrinier machine used in paper making. In this machine a wire gauze travels across a suction box continuously, passes over a series of rolls in the press and returns to the suction box. Two revolving rubber belts or deckle straps of considerable thickness form the sides to hold the pulp in place. Although this machine functions perfectly in paper making it is not wholly successful in making insulating board, due to the fact that the wire travels very slowly and is subjected to a rather low vacuum. The wire after a time becomes stretched unevenly. When this takes place the plate does not keep the wire evenly stretched and as a result the vacuum is broken and the mat does not form. Also this machine is not satisfactory relative to the rotating deckle straps as it is difficult to make them high enough to hold enough pulp to produce a thick board. Insulating board requires the mat from one to four inches thick in the suction machine. I have overcome all of the above objections by my new and novel machine as will be appreciated by those familiar in the art.

Referring to the drawings I have designated the elongated metal frame of my invention by the numeral 10. Secured by suitable means on the front end of this frame are two supporting arms 11, extending downwardly and outwardly therefrom.

Figure 1:
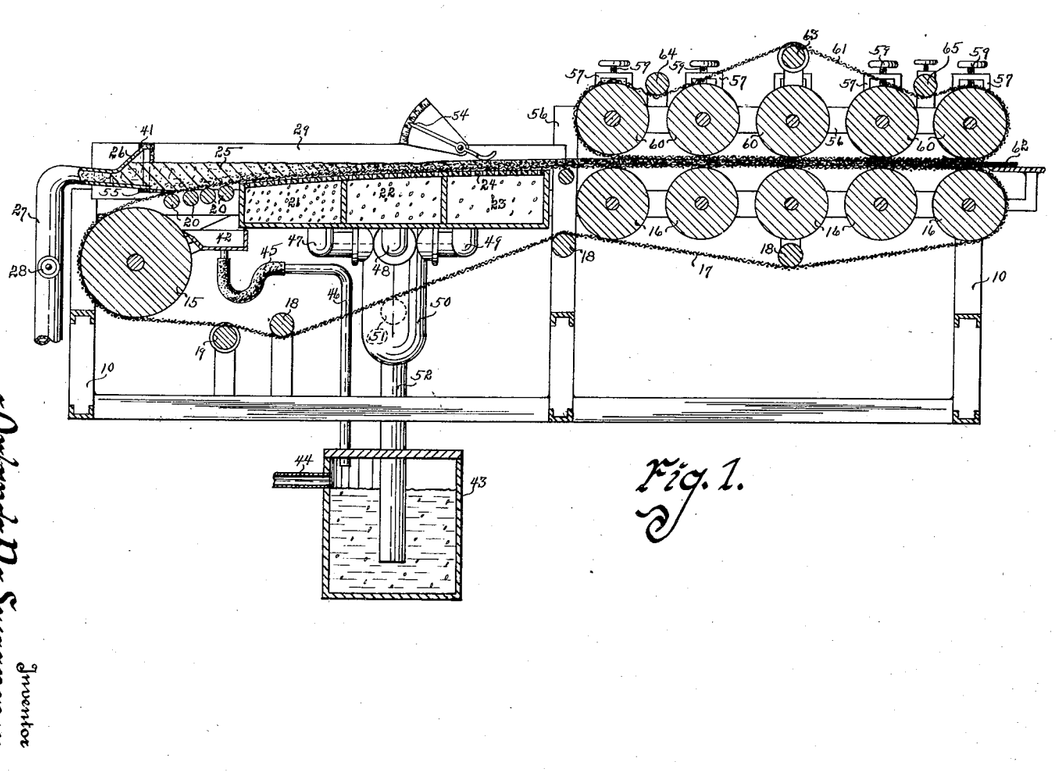
Figure 3:
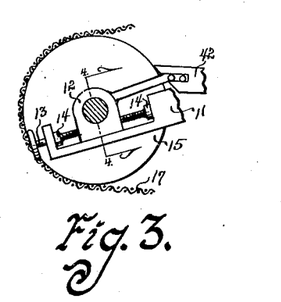
Fig. 3 is a side view of the breast roll and illustrates the manner in which the same may be adjusted to tighten the lower metallic screen.
Figure 4:
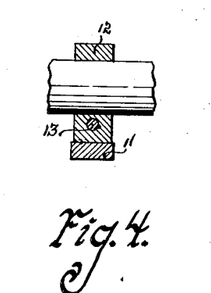
Fig. 4 is a cross sectional view of one of the bearing members rotatably holding one side of the breast roll and is taken on line 4—4 of Fig. 3.
Figure 5:
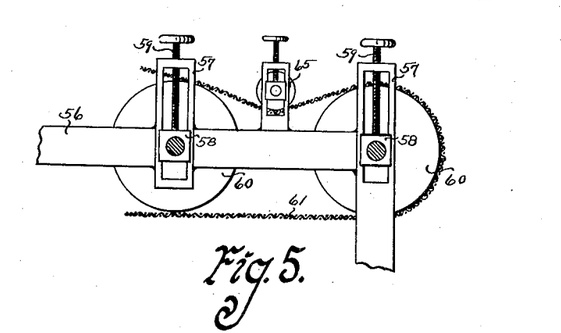
Fig. 5 is a side view of two of the upper press rolls illustrating the manner in which they are vertically adjusted and also the means for tightening the metallic screen embracing these rolls.
Figure 6:
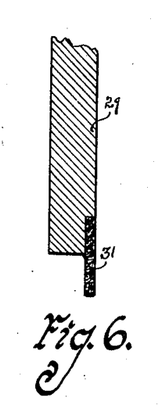
Fig. 6 is a cross sectional view of one of the deckle boards with a rubber metallic screen engaging flap for holding the liquid and semi-liquid material on the metallic screen.
Figure 7:
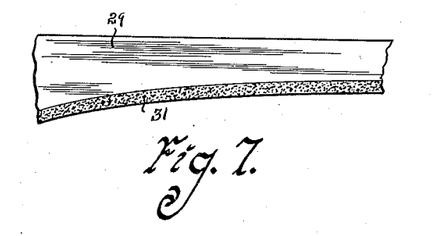
Fig. 7 is a side view of a portion of one of the deckle boards illustrating its logarithmic curve to conform with the logarithmic curve of the metallic screen at the front of the machine.

Slidably mounted in each of these arms is the bearing member 12 as shown in Fig. 3. Rotatably mounted in each of the arms 11 and threaded through the bearing member in that particular arm is the hand screw 13. Each of these hand screws are prevented from longitudinal movement relative to the arm in which they are secured by enlarged collars 14. Rotatably mounted in the two bearing members 12 is the breast or stretcher roll 15 as shown in Fig. 3. Rotatably mounted and spaced apart in the rear end of the frame 10, are five press rolls designated by the numeral 16. Extending around and embracing the breast roll 15 and press roll 16 as shown in Fig. 1, is the metallic screen 17. This screen may have its lower portion supported and held in proper positions by idlers 18 and may be held in proper relation to the rolls by an ordinary guide roll 19 as shown in Fig. 1. This guide roll may be hand adjusted or automatic as is desired. By such a described construction it will readily be seen that to tighten or loosen the metallic screen it is merely necessary to operate the hand screws 13.

One of the most important features of this machine is that the upper portion of the metallic screen 17 follows not a straight line, but a continuous curve from the breast roll to the first press roll 16. The configuration of this curve is roughly, a logarithmic one. In other words the property of this curve is that a tangential force component is added at every point in its progression from the breast roll to the press roll. This curve is accomplished and maintained as will hereinafter be seen. Just under the screen 17 and forward of the breast roll 15 are the table rolls 20, forming a table surface. Below the screen 17 and forward of the table rolls 20 are three suction boxes 21, 22, and 23, as shown in Fig. 1.

Figure 11:
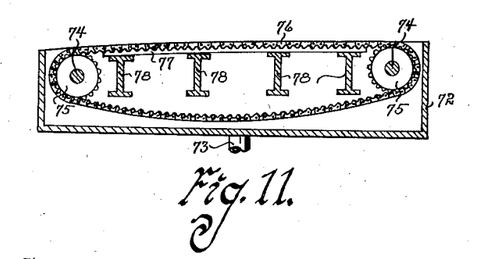
Fig. 11 is a side sectional view of a modified form of construction for causing the lower metallic screen to assume a logarithmic curve as it passes over the suction boxes. This construction also aids in supporting the metallic screen and promotes the life of the metallic screen.
Figure 14:
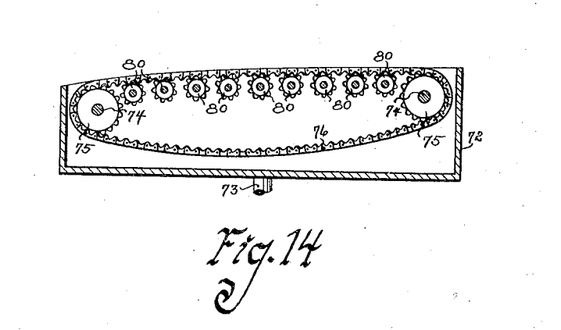
Fig. 14 is still another modified form of construction for properly supporting the metallic screen over the suction box. In this construction a plurality of tooth rollers are used for supporting the endless screen supporting chain.
Figure 15:
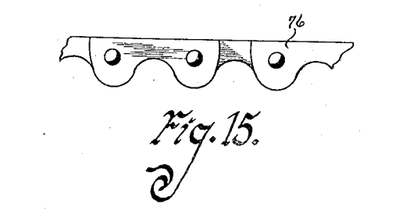
Fig. 15 is a side view of a portion of the chain used in the construction shown in Fig. 14.
Figure 16:
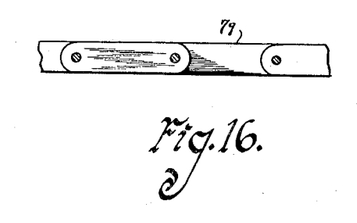
Fig. 16 is a side view of a portion of the supporting chain that may be used in the construction shown in Fig. 11.

These suction boxes have a perforated top 24 and are so situated and curved relative to each other and the table rolls 20, that the screen 17 resting on and passing over them will be maintained in a logarithmic curve as above discussed. When desired, or when a very light screen 17 is employed in a machine of this class various means such as shown in Fig. 11, and Fig. 14, may be provided for aiding and supporting the upper portion of the screen where it assumes its logarithmic curve.

By the employment of a logarithmic curve the metallic screen over the suction boxes will be properly stretched, due to friction of the screen on the suction boxes and rolls. It is upon this curved portion of the screen that the pulp flows onto the machine and the motion of the pulp is toward the rear or dry end of the machine. As the pulp flows in at the forward end of the machine, the metallic screen is moving forwardly and water is being removed from this pulp either by drainage through the table rolls or the suction boxes. The effect will be to thicket the pulp down until it emerges as a mat. As the mat emerges from the thickened pulp, the water surface is sucked into the last suction box, and a mat is produced which is so completely interlaced that the strength of the board is much greater, the texture finer, and the insulating properties generally better. Without conforming to the logarithmic or approximately logarithmic curve, the result will by no means be as satisfactory.
The pulp or semi-liquid mass 25 is fed to the front of the machine by a distributing nozzle 26 designed to evenly spread the pulp completely across the screen 17. The pulp or stock is fed to the distributing nozzle through a pipe 27 leading from a supply tank not shown. The amount of stock or pulp passing through the distributing member 26 is manually regulated by the valve 28 in the pipe 27, or may be automatically fed in by a regulator device actuated by the thickness of the mat.

Figure 8:
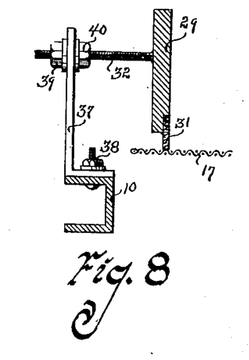
Fig. 8 is an end sectional view of one of the deckle boards and illustrates the manner in which its rear end is adjustably supported and secured to the frame of the invention.
Figure 9:
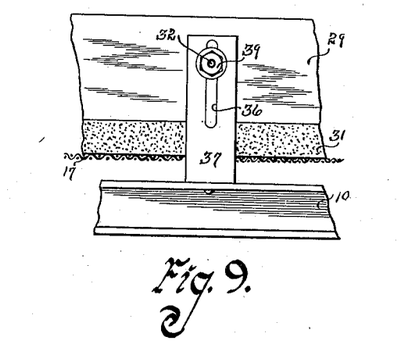
Fig. 9 is a side view of a portion of one of the deckle boards illustrating the manner in which the same may be adjusted to various positions relative to the metallic screen.

To prevent the pulp from flowing over the sides of the metallic screen 17 I have provided a deckle board 29 and 30, near the marginal edge of each side of the screen, respectively. These deckle boards are cut to conform with the logarithmic curve of the machine. Now, obviously, if these boards were pressed tightly downwardly on the metallic screen 17, the wire would be unable to move freely, and on the other hand if these boards were pressed too loosely over the wire, the pulp would leak through. To overcome this difficulty I have provided a rubber strip or the like 31 on the lower marginal edge of each of the deckle boards, respectively, and which is illustrated in Fig. 8. These strips each have their inner sides flush with the inner sides of the deckle boards, respectively.
In order to adjust these deckle boards to compensate for wear of the rubber members 31 I have adjustably mounted them on the frame 10, which I will describe as follows: Secured to each of the end portions of each of the deckle boards and extending outwardly and transversely therefrom is a threaded rod designated by the numerals 32, 33, 34, and 35.

Each of these threaded rods extend through a vertical slot 36 in a vertical bracket 37.
Each of these brackets are secured to the frame 10 by a bolt 38 as shown in Fig. 8. By the arrangement shown in Fig. 8, it will readily be appreciated that the bracket members 37 may be rigidly secured to the frame and may also be rotatably adjusted relative to the frame to which it is secured. On each side of each of the bracket members 37 and threaded onto the threaded rod passing through the slot in that particular bracket is a nut designated by the numerals 39 and 40.
By the use of these nuts the threaded rods supporting the respective ends of the deckle boards may not only be adjustably secured against vertical movement but the rods may be adjustably moved inwardly or outwardly in their slots 36.

Figure 2:
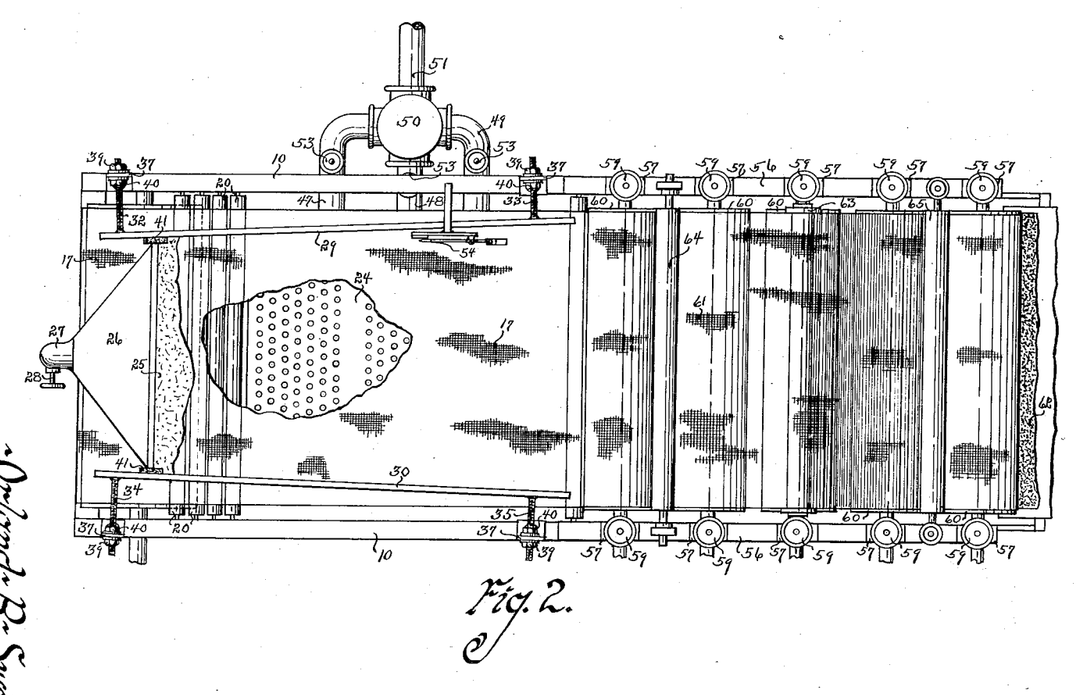
Fig. 2 is a top plan view of the machine with a section cut away in the metallic screen to show the positions of the suction boxes.

To prevent any leakage of the pulp between the distributing nozzle 26 and the deckle boards I have provided blocks of resilient material 41. As the rubber members 31 become worn by the metallic screen 17, the deckle boards may be easily moved to a lower position. Other types of rubber members 31 may be used if desired. It has been found that as the mat forms on the metallic screen there is a tendency for the edges of the mat to roll up, due to friction against the sides of the deckle boards. This is objectionable as it often results in cracking the edges of the mat. This difficulty, however, is easily overcome by so adjusting the deckle boards at their ends adjacent the press rolls, that they are further apart from each other than they are at the front end of the machine. This allows the mat as it moves along to be no longer in contact with the deckle boards, and further aids in removing any pulp that may have lodged under the rubber members 31. This last action is accomplished due to the fact that the metallic screen moves inwardly relative to the longitudinal axis of each of the deckle boards. The deckle boards should be placed and arranged so that they are a slight distance from the marginal edges of the screen 17 as shown in Fig. 2, and may be further adjusted, if desired to produce boards of various widths, but must be outside of the perforations in the suction box top 24.

As soon as the pulp spreads over the metallic screen from the nozzle 26 it commences to form the mat, the first step in this procedure is natural drainage of part of the liquid through the screen 17 at a point of the table rolls 20. This waste liquid falls into the tray 42 secured to the bearing members 12 as shown in Fig. 3. This tray has its forward side adjacent the breast roll 15 thereby removing any material that may have undesirably attached itself to the surface of the breast roll. By the tray 42 being secured to the bearing members 12 it will always be in proper position relative to the breast roll regardless of the position of the breast roll for adjustment purposes. The numeral 43 designates a liquid receiving receptacle having an outlet pipe 44 near its top. The waste liquid from the tray 42 passes through the rubber hose 45 and then through the pipe 46 into the receptacle 43. The rubber hose 45 permits the free movement of the tray with the breast roll. From this stage the mat slowly proceeds over the suction boxes which removes all free liquid from the pulp by suction. This is accomplished by the pipes 47, 48 and 49 leading to the enlarged vertical pipe 50 from the suction boxes 21, 22, and 23, respectively. The pipe 51 communicates with the enlarged vertical pipe 50 at a point in its side and is designed to lead to a suitable suction producing means not shown. The numeral 52 designates a pipe communicating with the bottom of the enlarged vertical pipe 50 and terminating near the bottom of the receptacle 43. In each of the pipes 47, 48 and 49, is a manually operated valve 53. By the use of the valves 53 the vacuum in each suction box may be controlled to correspond with the requirements of the pulp passing over it. Naturally in the first suction box there will be more water and less air entering through its perforated top, while the last suction box will obtain more air and less liquid. The thicker the board desired under normal conditions the greater must be the suction to remove the water, and the valves 53 will compensate for this. By using the logarithmic principle we greatly increase the water suction area by each slight additional thickness of the board, and this is another advantage of the logarithmic principle. If the mat progressively thickens from front to rear of the machine, a certain amount of pulp settles through the liquid, according to the well known "falling leaf" principle. A certain amount of it is pulled toward the suction surface by the flow of the liquid and at the same time the bottom surface is in effect rising toward the top of the mat. The net result of these motions, is to form a mat which, as the water disappears at some point of the machines, is well felted. The thickness of the mat as before seen may easily be controlled by the valve 28 and I have provided a small depth scale 54 on the frame to facilitate the obtaining of mats of uniform thickness. In the drawing I show this depth scale merely as a guide to the operator of the machine, but if it is desired suitable electrical contact points or the like may be placed on the scale capable of being engaged by the depth needle and which are in electrical communication with suitable means for automatically operating the valve 28. It will be appreciated, however, that the best results will be obtained regardless of the thickness of the mat, if the lowest possible vacuum in the suction boxes is used. I have found that machines work successfully on a vacuum of not more than six inches and for free stock will work as little as one-half inch of vacuum.

The waste liquid obtained in the suction boxes will pass through the pipes 47, 48 and 49, into the enlarged vertical pipe 50 from which it will pass into the receptacle 43. This waste liquid obtained in the receptacle 43 may run directly to the sewer drain or can be returned to the process or can be used as diluting water with the inlet stock. It is evident that the water leg must be of sufficient length to give the desired amount of suction. It is also practical to replace the air suction and water leg by a suitable pump operatively connected to the suction boxes. To keep the liquid from running back between the metallic screen 17 and the distributing member 26 I use a rubber flap 55. This flap is secured to the member 26 and lays at an angle on and over the wire or screen so that the screen will drag freely under it. This flap is kept in a sealed condition however by the hydrostatic head of the pulp above it. For best results it is advisable to adjust the machine so that the consistency water level disappears and the mat emerges well up on the flat part of the curve. If this is done a slight increase in the quantity of incoming pulp greatly increases the total area of the liquid in the machine, thereby increasing the water suction and decreasing the air suction.

The numeral 56 designates a bracket member mounted on the rear end at each side of the frame 10. Diametrically opposite from each other and spaced apart on each of the bracket members 56 are five cage members 57. Slidably mounted in each of these vertical cage members is the bearing member 58. The numeral 59 designates a hand screw threaded in the top of each cage member 57 and swively engaging the bearing member in that respective cage for adjustably lowering and raising the same. Rotatably mounted in each pair of bearing members 58 that are diametrically opposite from each other is a press roll 60. The numeral 61 designates an endless metallic screen embracing the fire press rolls 60. It should here be noted that the five press rolls 60 are directly above the five press rolls 16, respectively, and naturally as the mat moves forwardly with the screen 17, it will pass between these five sets of press rolls which will squeeze and press the mat into desirable insulating lumber 62.

The numerals 63 and 64 designate a screen guide roll and idler engaging the screen 61 while the numeral 65 designates a vertically adjustable roller for tightening or loosening the metallic screen 61. In order to obtain the best results each pair of press rolls should progressively be closer together from the front of the machine to the rear of the machine as is shown in Fig. 1. Many other means may be employed for pressing the mat into insulating lumber, if desired, such as the caterpillar press machine, the purpose of the invention being regardless of what pressing means is used to return the screen 17 back to a position where it may continually pass over the suction boxes.

Figure 10:
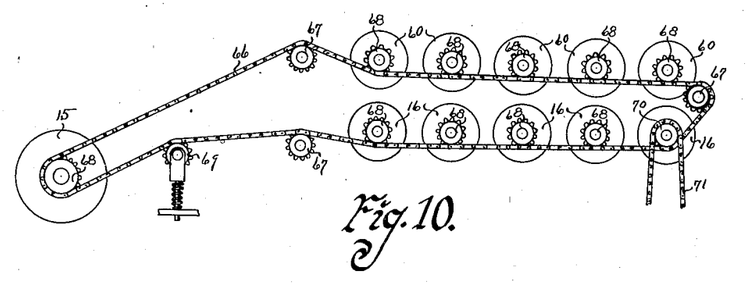
Fig. 10 is a side view illustrating one method in which the breast roll and press rolls are operatively connected to each other for rotation.

In Fig. 10, I show one way of operatively connecting the breast roll and the press rolls one to the other in order that they will all rotate at desired speed relative to each other. In this view a chain 66 engages idlers 67 and sprocket wheels 68 on each of the rollers. To compensate for the adjustment of the breast roll moving backwardly and forwardly for the adjustment of the metallic screen I have provided an automatic compensating idler 69 in engagement with the sprocket chain 66 as shown in Fig. 10. On the shafts of one of the rolls I have secured a sprocket wheel 70 engaging a chain 71 designed to lead to a prime mover not shown.

From the foregoing description of my invention it will readily be appreciated that my machine will produce a mat which is so completely interlaced with pulp fiber that the strength of the board from the mat will be extremely great and possess excellent insulating properties.

Figure 12:
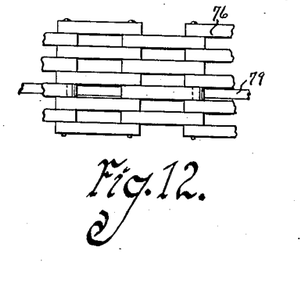
Fig. 12 is a top plan view of a portion of the endless supporting chain used in the construction shown in Fig. 11.
Figure 13:
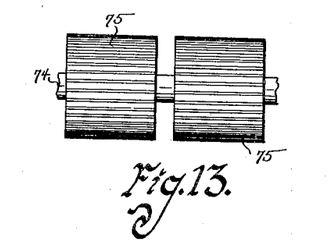
Fig. 13 is a side view of two of the supporting rollers that may be used for supporting a porous chain used for enclosing the top of the suction boxes.

In Figures 11, 12, 13, 14, 15, and 16, I illustrate different methods of properly holding and supporting the metallic screen 17 over the top of the suction box or boxes. Previously I have described this metallic screen as being supported by the perforated top of the suction box but in the modified forms herein explained, I use a traveling chain designed to travel at the same rate as the travel of the metallic screen 17. When a traveling chain is used I have designated the suction box by the numeral 72 having the suction pipe 73 leading from its bottom. These boxes 72 will open at their top. Rotatably mounted in each end of the suction box 72 is a shaft 74 carrying a plurality of toothed rollers 75. Embracing these toothed rollers is an endless chain 76 extending across the top of the suction box. This chain is of porous construction as shown in Fig. 12 and through which the water is drawn into the suction box from the mat on the metallic screen above it. In order that the upper portion of this chain 76 will assume a logarithmic curve I have provided a plurality of supporting bars 77 supported under the chain on I-beams 78 in the suction box. The bars 77 each have their tops forming the desirable logarithmic curve. To properly hold the chain on and relative to the bars 77 I have provided straight links 79 in the chain 76. These straight links 79 slide on the top of the bars and prevent the chain from side movement. Fig. 14 is still another modified form of construction. In Fig. 14 there are a plurality of shafts 80 near the top of the suction box 72. It will here be noted that the line formed by these plurality of shafts is in the form of a logarithmic curve. Loosely mounted on each of these shafts 80 are a plurality of loosely mounted sprocket gears engaging the underside of the porous chain and properly supporting it as before described. Such a construction as shown in Fig. 11 and Fig. 14 is desirable when a very light metallic screen 17 is used, due to the fact that there is very little friction on the screen as it moves over the suction boxes. Such arrangements also give longer life to the metallic screen regardless of its strength. The screens 17 and 61 may be made of other material but regardless of the material they are made of they should be sufficiently perforated to permit water or liquid from the mat to pass through them.

Some changes may be made in the construction and arrangement of my improved combination machine for producing insulating lumber, without departing from the real spirit and purpose of my invention, and it is my intention to cover by my claims any modified forms of structure or use of mechanical equivalents which may be reasonably included within their scope.

I claim:

1. In a device of the class described, a frame, a continuous metallic screen mounted for rotation, a means for causing said screen to maintain a logarithmic curve in a portion of its travel, a distributing member for depositing pulp on said screen at the point of its logarithmic curve, and a means for producing a suction under said screen at a point in its logarithmic curve.

2. In a device of the class described, a frame, a continuous metallic screen mounted for rotation, a means for causing said screen to maintain a logarithmic curve in a portion of its travel, a distributing member for depositing pulp on said screen at a point in its logarithmic curve, and a means for producing a vacuum on the underside of said screen at various points along its logarithmic curve.

3. In a device of the class described, a frame, a continuous metallic screen mounted for rotation, a means for causing said screen to maintain a logarithmic curve in a portion of its travel, a distributing member for depositing pulp on said screen at a point in its logarithmic curve, a plurality of suction boxes placed at various points under said screen and along its logarithmic curve, and a means for independently controlling the amount of vacuum in each of said suction boxes.

4. In a device of the class described, a box, a perforated curved top on said box, a means for producing a vacuum in said box, a continuous metallic screen mounted for rotation and slidably mounted over the top of said box, a dispensing pipe for placing pulp on said screen as it passes over said box, and stationary confining members for holding said pulp on said screen until said pulp is moved over said suction box.

5. In a device of the class described, a frame, an endless metallic screen mounted in said frame for rotation, a pulp distributing nozzle above said screen, table rolls under said screen at points where the pulp is discharged on said screen, a tray for catching liquid passing through said screen adjacent said rollers, a suction box forward of said table rolls having a curved perforated top engaging the underside of the upper portion of said metallic screen for causing the same to assume a logarithmic curve, and a means for producing a vacuum inside said suction box.

6. In a device of the class described, a frame, a plurality of rollers rotatably mounted in said frame, an endless metallic screen embracing said rollers, a pulp distributing nozzle designed to distribute pulp on the upper surface of said screen, a valve for controlling the amount of pulp passing through said nozzle, a plurality of suction boxes having their tops perforated and so arranged and positioned under said screen as to cause said screen to assume a curved line forward of said nozzle, and a means for producing a vacuum inside said suction boxes.

7. In a device of the class described, a frame, an endless metallic screen mounted in said frame for rotation, a means for causing said screen to maintain a logarithmic curve in a portion of its travel a means for producing a vacuum on the underside of the upper portion of said screen, and at a point in its logarithmic curve a pipe for discharging pulp on said screen and in the rear of travel of said screen from said vacuum means, a deckle board adjacent each of the marginal edges of the upper portion of said screen, and a resilient member secured to each of said deckle boards loosely engaging said screen.

8. In a device of the class described, a frame, an endless metallic screen mounted for rotation in said frame, a means for causing said screen to maintain a logarithmic curve in a portion of its travel, a means for producing a vacuum under said screen at one point in the logarithmic curve of its travel, a pulp dispensing member adjacent said screen and to the rear of said vacuum means, a deckle board adjacent each marginal edge of said screen for holding the pulp on said screen until it passes over said vacuum means, and a means for vertically and horizontally adjusting each of said deckle boards.

9. In a device of the class described, a frame, a suction box secured on said frame having a curved perforated top, a means for producing a vacuum in said box, an endless metallic screen rotatably mounted in said frame and passing over and engaging the top of said suction box, a means for adjustably tightening said screen, a guide roller for holding said screen in proper alignment, a pulp dispensing member adjacent said screen and to the rear of said suction box, and a means for pressing the mat formed by said pulp passing said suction box into insulating board.

10. In a device of the class described, a frame, a breast roll rotatably mounted on said frame, a second roll rotatably mounted on said frame, a continuous screen embracing said rolls, a suction box below the underside of the upper portion of said screen, a means for producing a vacuum inside said suction box, an endless porous supporting chain rotatably mounted in said suction box having its top portion traveling in a logarithmic curve enclosing the top of said suction box and supporting said screen, a dispensing member for depositing pulp on the upper portion of said screen, and a means for rotating said rollers and said supporting chain.

11. In a device of the class described, a frame, a plurality of rollers rotatably mounted in said frame, an endless metallic screen embracing said rollers, a suction box under the upper portion of said screen, an endless porous chain rotatably mounted in the top of said suction box enclosing the top of said suction box and supporting said screen, a means for supporting the upper portion of said enless chain in a logarithmic curve, a dispensing member for depositing pulp on said screen and in advance of said screen over said suction box, and a means for rotating said screen and said chain at approximately the same speed.

12. In a device of the class described, a frame, a plurality of rolls rotatably mounted in said frame, an endless perforated member around said rolls, a suction box under the upper portion of said perforated member, an endless porous chain rotatably mounted in the upper portion of said suction box for enclosing the same and supporting said perforated member, a plurality of rollers engaging the underside of the upper portion of said chain for causing the upper portion of said chain to assume a logarithmic curve, a dispensing member for depositing pulp on the upper portion of said perforated member, and a means for rotating said perforated member and said chain.

13. In a device of the class described, a frame, a breast roll rotatably mounted in said frame, a second roll rotatably mounted in said frame, a continuous screen embracing said rolls, a suction box under the upper portion of said screen and between said two rolls, small table rolls between said breast roll and said suction box engaging said screen, a means for moving said breast roll relative to said second roll for tightening and loosening said screen, a receptacle secured to the bearing members of said breast roll and positioned adjacent the periphery of said breast roll and under said table rolls, a water leg communicating with said suction box, a drainage pipe leading from said receptacle, a means for producing a suction inside said suction box, and a dispensing member for depositing pulp on said screen and above said table rolls.

14. In a device of the class described, a frame, a plurality of rolls rotatably mounted in said frame, a continuous metallic screen embracing said rolls, a suction box under said screen and forward of one of said rollers, so constructed as to cause said screen to assume a logarithmic curve, a pulp distributing nozzle for distributing pulp on said screen before it reaches said suction box, a resilient flap loosely engaging said screen for preventing said pulp to run backwardly from said suction box, and a means for rotating said screen.

ORLAND R. SWEENEY.